Aug. 14, 1945.  E. R. KOPPEL  2,382,489
CONNECTION FOR CONTAINERS
Filed July 13, 1942
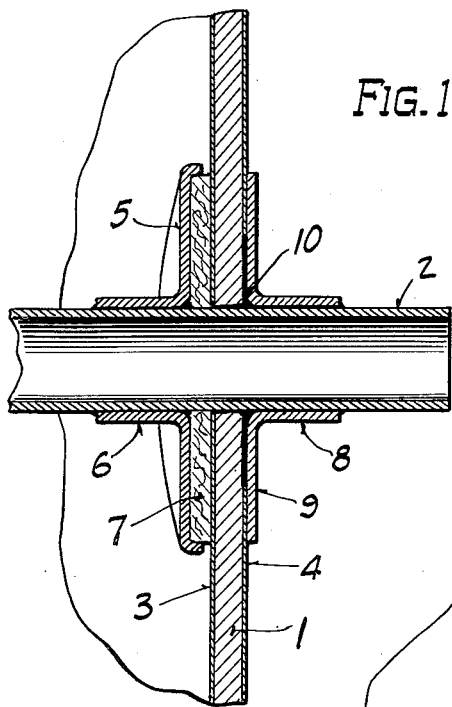
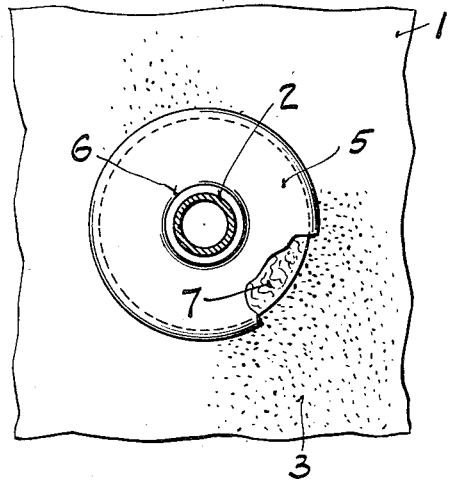
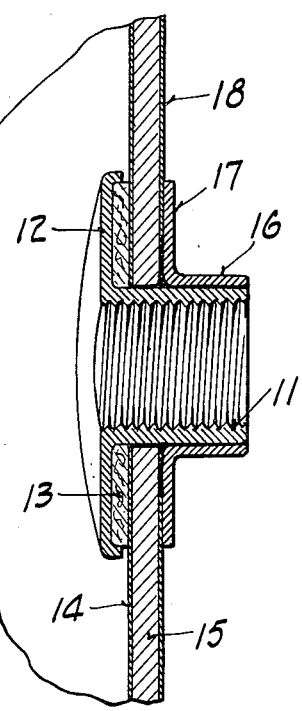
Ernst R. Koppel
INVENTOR.
BY *Elvin A. Andrus*
ATTORNEY.

Patented Aug. 14, 1945

2,382,489

UNITED STATES PATENT OFFICE 2,382,489

CONNECTION FOR CONTAINERS

Ernst R. Koppel, Milwaukee, Wis., assignor to A. O. Smith Corporation, Milwaukee, Wis., a corporation of New York Application July 13, 1942, Serial No. 450,811

5 Claims. (Cl. 285—49)

This invention relates to a connection for a container which is enameled either inside or outside or on both sides.

The invention has been specifically applied to the construction of ceramic enameled water coolers where it is employed for sealing the copper tubing of the refrigerator coil as it passes through the wall of the cooler tank. A similar connection may be employed to provide for the inlet and outlet for liquid in the cooler tank.

Where such a tank is both lined and coated with enamel, and it is desired to apply the connection subsequent to the enameling operations, it is extremely difficult, if not impossible, to provide a weld seal without injuring the enamel. The exposure of the tank wall adjacent the connection and at the edge of the enamel lining may result in objectionable corrosion.

The principal object of the invention is to provide a satisfactory seal for such a connection without injuring the enamel.

According to the invention, the connection is brazed to the tank wall at temperatures not injurious to the enamel, and the construction of the connection and joint is such that the brazing is protected from excessive stress and the connection reinforced against deflection.

The invention is illustrated in the accompanying drawing in which:

Figure 1 is a longitudinal section of a connection and a portion of a container wall;

Fig. 2 is an inner elevation of the connection with parts broken away and sectioned; and Fig. 3 is a longitudinal section of another embodiment of the invention as applied to a pipe connection.

Referring to Figures 1 and 2, the sheet metal tank wall 1 has an opening therein through which the tube 2 of a cooling coil extends. The tube 2 is ordinarily of copper which is generally non-corrosive, while the wall 1 is of steel susceptible of corrosion.

The wall 1 is lined on the inside with a vitreous ceramic material 3 and coated on the outside with a similar material 4. The lining 3 protects the metal of wall 1 from corrosion by the water contained in the tank, while the coating 4 similarly protects the metal of wall 1 from moisture condensed on the outside of the tank, as when the latter serves as a water cooler.

The tube 2 has an inner flange 5 preferably constructed with a tubular ferrule-like body 6 brazed or otherwise secured to the tube. The flange 5 overlaps the lining 3 for a substantial radial distance around the connection and water is prevented from circulating to the edge of the lining 3 adjacent tube 2 by a suitable packing material 7. The material 7 is preferably a gasket of asbestos or glass fiber and is disposed against flange 5 prior to assembly of tube 2 in the opening in wall 1.

A flanged ferrule 8 is applied to the outer end of the tube 2 after the latter has been assembled with the tank wall 1, and the flange 9 of the ferrule is pressed against the outer enamel coating 4 while the packing 7 is compressed between flange 5 and lining 3. While the parts are held in this position, the tube 2 is brazed to the edge of wall 1 at the opening and to ferrule 8, and the flange 9 is brazed or soldered to an exposed section of the wall 1 between the edge of the opening and the edge of coating 4.

The brazing is accomplished by providing a ring or washer of solder or brazing material 10 between flange 9 and wall 1, and after assembly of the parts, as described, heating the same to a suitable brazing temperature, preferably in a controlled atmosphere. This operation is done at temperatures which are not injurious to the enamel. The solder 10 enters the clearance space between the tube 2 and wall 1 and ferrule 8 by capillary action, and when cooled it integrally secures the parts together. If desired, additional brazing material may be supplied to the joint.

For some purposes it may be sufficient to only braze the tube 2 to the surrounding edge of wall 1 without employing the flanged ferrule 8. For others, it may be best to eliminate the brazing between the tube 2 and wall 1, and to rely upon that between the ferrule 8 and tube 2 and between ferrule 8 and wall 1 to hold the parts together and seal the joint. However, the construction illustrated has been found to be preferable.

The ferrules 6 and 8 integral with the respective flanges 5 and 9 serve to reinforce the tubing 2 against deflection and also the relatively thin wall 1 against movement that might injure the enamel lining and coating.

The modified embodiment of the invention illustrated in Fig. 3 comprises an internally threaded tubular spud 11 of corrosion resistant metal with a flange 12 at its inner end compressing the gasket 13 against the enamel lining 14 of the tank wall 15. The spud 11 is held in place by a ferrule 16 encircling the outer end of the spud and having a flange 17 pressing against the enamel coating 18 on the outer surface of wall 15. The ferrule 16 is brazed to the spud 11 and the flange 17 is brazed to the wall 15 to seal the joint. The spud 11 may be and preferably is additionally brazed to the edge of wall 15. The brazing is carried out in the same manner as that described for the embodiment of Figures 1 and 2.

The ferrule 16 supports the spud against deflection, and the flanges 12 and 17 provide a large bearing which reinforces wall 15 at the connection.

Various embodiments of the invention may be employed within the scope of the accompanying claims.

I claim:

1. In combination, a sheet metal member having an opening therethrough and a protective coating of ceramic enamel on at least one of its sides, a tubular member extending through said opening and brazed to said sheet metal member at the edge thereof without injuring the previously applied enamel coating, a flange on said tubular member disposed to overlap said coating adjacent said opening for a substantial radial distance from the opening with a gasket therebetween to prevent circulation of fluid to the joint, and a flanged ferrule on said tubular member on the opposite side of said sheet metal member from said flange and having a diameter approximating that of said flange to confine the wall of said sheet metal member therebetween and reinforce the same adjacent said opening, said ferrule being secured to said tubular member.

2. In combination, a sheet metal member having an opening therethrough and a protective coating on at least one of its sides, a tubular member fitting in said opening and extending through said sheet metal member, a disc-like flange on said tubular member and overlapping said coating on one side of said sheet metal member for a substantial radial distance from the opening, protective material compressed between said flange and sheet metal member to prevent circulation of fluid to the opening, and a washer member encircling said tubular member on the other side of said sheet metal member and brazed to both members, said washer member lying tightly against the coating on said sheet metal member and confining the wall thereof between it and said disc-like flange to prevent injury to the coating from flexing of the wall.

3. A connection for a sheet metal container having the sheet metal covered with corrosion resistant material to protect the same from corrosion in service and an opening in a wall thereof to receive a connection, said connection comprising a corrosion resistant tube disposed in said opening with one end projecting inside and the other end outside the container and with the body of said tube brazed to the edge of the opening in said wall without injury to the previously applied protective coating on said container and to prevent the escape of fluid between the tube and wall, an inner corrosion resistant ferrule disposed around the inner projecting end of said tube with one portion of the ferrule being brazed to the tube and another portion thereof disposed to overlap the wall of said container for a substantial distance, and an outer corrosion resistant ferrule disposed around the outer projecting end of said tube with one portion secured to the tube and another portion secured to the container wall to provide a barrier against escape of fluid in addition to the brazed joint between said tube and wall.

4. A connection for a metal container having the sheet metal shell thereof covered with corrosion resistant material to protect the same from corrosion in service and an opening in a wall thereof to receive a connection, said connection comprising a corrosion resistant tube disposed in said opening with one end projecting inside and the other end outside the container and with the body of said tube brazed to the edge of said wall at the opening to prevent the escape of fluid between the tube and wall, an inner corrosion resistant ferrule disposed around the inner projecting end of said tube with one part of the ferrule being brazed to the tube and another part being disposed to overlap the wall of said container for a substantial distance to strengthen said tube against angular displacement relative to the inner surface of the wall of the container, a corrosion resistant gasket disposed between said ferrule and wall to prevent circulation of contained fluid to the metal adjacent the opening, and an outer corrosion resistant ferrule disposed around the outer projecting end of said tube with one part secured to the tube and another part disposed to overlap the wall of said container for a substantial distance to prevent angular displacement of said tube relative to the outer surface of the wall of said container.

5. A connection for a container having a sheet metal shell with an opening therein to receive a connection and a ceramic enamel corrosion protective lining on the inside extending substantially to the edge of said opening and a similar coating on the outside extending to a point slightly removed from said opening, said connection comprising a corrosion resistant tube disposed in said opening with one end projecting inside and the other end outside the cooler and with the body of the tube brazed to the edge of the opening in the shell of the cooler to seal the joint therebetween and prevent escape of contained fluid, an inner corrosion resistant ferrule disposed around the inner projecting end of said tube with the tubular part of the ferrule being brazed to the tube and the flange thereof disposed to overlap the shell of said container for a substantial distance, a corrosion resistant fiber glass gasket provided between the flange of said ferrule and shell to prevent circulation of contained fluid to the metal adjacent the opening, and an outer corrosion resistant ferrule provided around the outer projecting end of said tube with the tubular part of the ferrule being brazed to the tube and the flange thereof being brazed to the exposed metal disposed between the edge of the enamel coating and the edge of the opening in the container to seal the joint against escape of fluid in addition to the brazed joint between said tube and shell.

ERNST R. KOPPEL.